Figure 1:
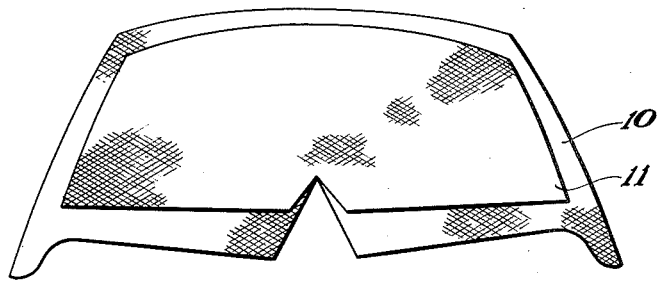

May 22, 1962 W. H. HEATON ETAL 3,035,292
PROCESS OF FORMING AND STIFFENING SHOE PARTS
BY MEANS OF A POLYMERIZABLE
AND THERMOPLASTIC RESIN
Filed Oct. 16, 1958

INVENTOR.
Walter H. Heaton &
J. Harold Gaquin
By Schway, Jenney, Witter & Hildreth
ATTORNEYS United States Patent Office 3,035,292
Patented May 22, 1962

3,035,292
PROCESS OF FORMING AND STIFFENING SHOE PARTS BY MEANS OF A POLYMERIZABLE AND THERMOPLASTIC RESIN
Walter H. Heaton, Franklin, and John Harold Gaquin, Haverhill, Mass., assignors to Beckwith-Arden Inc., Watertown, Mass., a corporation of New Hampshire
Filed Oct. 16, 1958, Ser. No. 767,689
6 Claims. (Cl. 12—146)

The present invention comprises a new and improved process of forming and stiffening any selected area of an upper such as the counter portion of a shoe.

Heretofore the desired shape and stiffness has been imparted to the quarters or counter portion of the upper by inserting a molded counter of stiff fiberboard into a counter pocket formed in the lining of the upper, usually at the time of the conventional assembling operation. This procedure is satisfactory only in case the counter stiffener inserted is of the correct size and shape and is accurately and skillfully inserted without twisting or other displacement from a true symmetrical position. There are, of course, many departures from the ideal procedure and the correction of these failures involves serious cost to the manufacturer. Even if the greatest care is exercised by the operator, a premolded counter is often so stiff that it prevents the upper from accurately conforming to the fine lines of the last particularly about the shoulder formed by the insole with the last bottom.

The difficulties above discussed have in a large measure retarded the application of automation to the shoemaking industry. The hand operation of placing a molded counter in the upper and the incompliant texture of the counter itself defeat automatic shoemaking procedure.

The process herein disclosed is characterized by the employment of elements that may be incorporated in flexible condition into the upper, shaped by conventional quarter molding or lasting operations, and then stiffened with the upper in situ in molded contour. This procedure makes an important reduction in shoemaking costs and results in a product of improved quality.

Going more into detail, our novel process is characterized by the employment of a resin that may be caused to undergo polymerization to a final insoluble infusible stage by the action of a catalyst, and which prior to final polymerization exist in a solid thermoplastic stage, generally designated A-stage or B-stage. Resins of this type are well-known in the art, and are referred to herein as thermoplastic resins polymerizable to an insoluble infusible stage. They have however never been employed in shoe uppers as now disclosed, viz. for stiffening different resin-coated areas of the upper by polymerization on the one hand and by molding under heat and pressure on the other hand.

A preferred resin suitable for the purposes of this invention is a water soluble A-stage urea-formaldehyde resin, such as Urac 180 sold by American Cyanamid, which may be catalyzed effectively with ammonium chloride.

Our novel process is carried out by impregnating an area of a closed upper with such urea-formaldehyde resin, shaping and converting a limited portion of the impregnated area of the upper into a resilient and somewhat stiff condition by contacting it with a catalyst, and then molding and stiffening selected portions of the uncontacted but impregnated area of the upper by thermoplastic treatment.

As applied to forming the rear or counter portion of an upper, the inner face of the upper, including its lasting margin, may be coated with the resin. A blank approximately of counter shape impregnated with ammonium chloride is then incorporated in the upper and so disposed as to leave a substantial lasting margin of the upper clear and out of contact below it. The contacted counter portion of the upper is rendered resilient and somewhat stiff by the condensation reaction thus brought about. The uncontacted but resin-impregnated lasting margin of the upper, we have discovered, is thermoplastic at this stage. Accordingly, the heel seat is completed by subjecting the lasting margin to heat and pressure applied by a conventional heel seat lasting machine or by hand. Upon cooling the now molded and stiffened lasting margin is set in such shape as to bring out accurately the fine lines of the last or of the molds employed in shaping it.

It will be seen that by the foregoing procedure the constituent parts of the upper are all assembled in flexible condition and remain in that condition while being brought into conformity with the last or mold. While there is ordinarily no difficulty in accurately placing and holding the catalyst-carrying blank in position, extreme accuracy is not required because however located the blank will be conformed accurately to the contour of the last without any tendency to bridge or depart from the desired contour.

Figure 2:
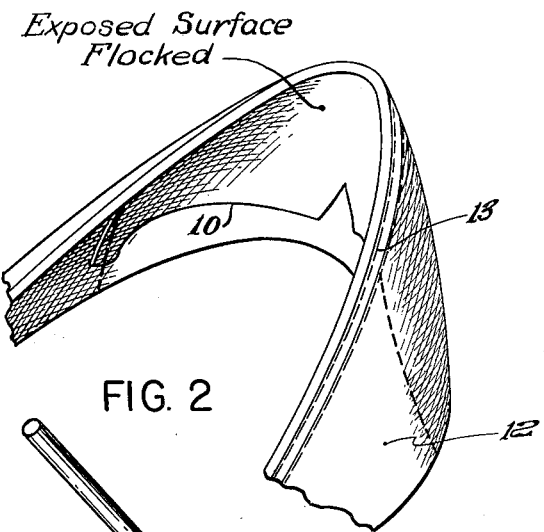
Figure 4:
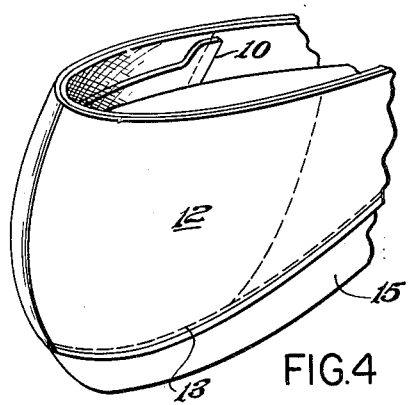
Figure 3:
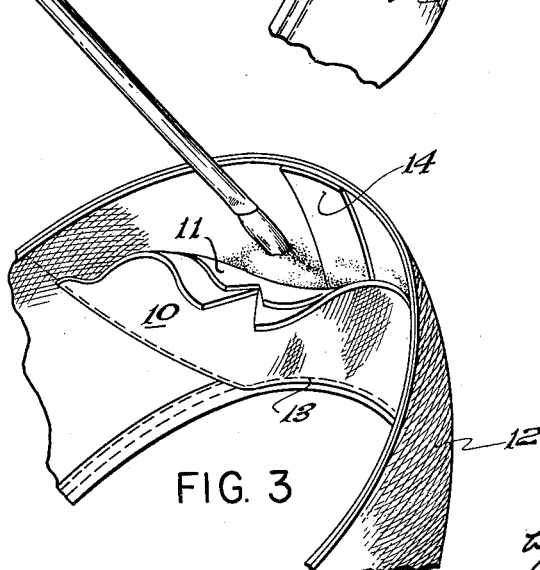
Figure 5:
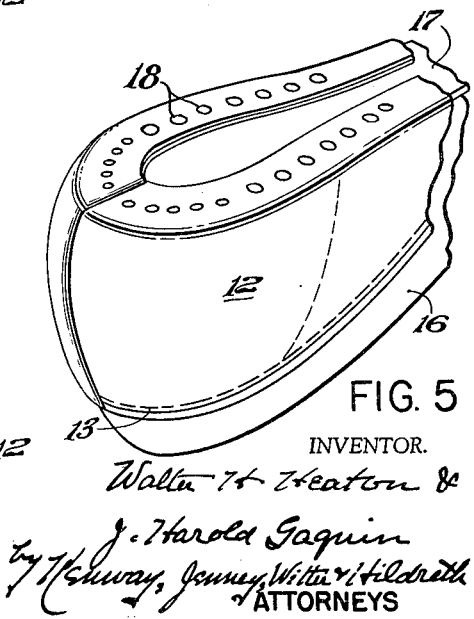

These and other features and characteristics of the process will be best understood and appreciated from the following disclosure of a preferred manner of carrying it out as shown in the accompanying drawings in which:

FIG. 1 is a plan view of a counter pocket and its attached catalyst-impregnated blank, FIG. 2 is a fragmentary view showing a flocked counter pocket in place as the lining of the upper in accordance with a modification of the process as illustrated in the other figures of the drawing, FIG. 3 is a fragmentary view in perspective suggesting the step of applying the resin to the outer integument of the upper, FIG. 4 is a fragmentary view in perspective suggesting a molding or forming step, and FIG. 5 is a fragmentary view in perspective suggesting a heel seat lasting step.

In the accompanying drawings the counter lining part 10 as shown in FIG. 1 is of conventional shape and may be formed from any suitable lining material such as light natural leather, artificial leather, or textile fabric. Upon this lining 10 is superposed a textile blank 11 which is cut so that it lies entirely within the contour of the counter lining. The blank 11 is impregnated or cut from stock which has been impregnated with a catalyst such as ammonium chloride for expediting the condensation reaction of a resin such as the incompletely condensed urea formaldehyde resin above identified. Typical of such resins are thiourea-aldehyde, melamine-aldehyde or phenolaldehyde. While ammonium chloride is a satisfactory catalyst, ammonium phosphate, phosphoric acid, hydrochloric acid or their equivalents may be employed as the catalystic component required in the practice of the process.

Having superposed the catalyst-impregnated blank 11 upon the counter lining 10 as suggested in FIG. 1, the counter lining is assembled in the rear portion of the lined upper 12 in the usual manner by a line of top stitching 13 and stitching along the two side edges of the counter lining located always outwardly beyond the contour of the catalyst-carrying blank 11 so that the stitching passes only through the exposed margin of the counter lining 10.

The lower edge of the superposed parts 10 and 11 is therefore entirely free at this stage so that these parts may be temporarily separated from the upper as suggested in FIG. 3. In this figure the upper is shown in inverted position with the backstay 14 exposed. The liquid aminoplast is now brought into contact with the catalyst-impregnated blank 11 by being applied either to the blank or to the inner surface of the upper. The counter lining is then restored to its proper position in the upper while the blank 11 and adjacent portions of the upper remain in flexible and conformable condition.

A quarter molding step may then be carried out as suggested in FIG. 4 in which the male mold is indicated by reference character 15. The upper, with its counter pocket 10 and the catalyst-impregnated blank 11 still in flexible condition, is conformed to the shape of the mold 15 by cooperating concave molds, not shown, and held under conditions of heat and pressure while condensation reaction takes place in the now catalysed aminoplast and only in the area contacted by the blank 11 with the coated inner surface of the outer integument 12. The upper may be molded as shown in FIG. 4 with its side walls extending upwardly above the mold 15.

The upper, with its molded and stiffened counter portion, may now be assembled in conventional manner upon a last 16 carrying an insole 17 as suggested in FIG. 5. The upstanding and still flexible lasting margin, uncontacted by the catalyst of the blank 11 but coated with the aminoplast, may now be molded under heat and pressure as thermoplastic sheet material, stiffening upon cooling, and the heel seat secured by the usual nails 18. The heel seat lasting operation may be carried out by hand or with assistance of available automatic heel seat lasting machines equipped with heated concave dies.

It will be understood that when heated the resin which has been incorporated in the upper becomes adhesive so that in the thermoplastic molding steps the various components of the upper and its lining become bonded firmly and permanently together.

In accordance with an optional modification of our invention the material of the counter lining 10 or the blank itself may be impregnated with the catalyst and flocked on its surface which is to be exposed within the shoe and thus given a desirable suede appearance. The flocking is applied after the impregnating step so that the ammonium chloride or other catalyst does not saturate the flocking but is confined entirely to the underlying fabric. In this case the blank 11 is of course omitted and a two-ply structure results as suggested in FIG. 2.

It will be appreciated that the preparatory steps of the process are all stitching room operations, viz. the cutting of the lining material for the counter lining, the cutting of the dry catalyst-carrying blank, the cementing of the blank, using latex cement for example, to the counter lining and the stitching of the counter pocket in the upper.

The advantage of dealing with assembled upper parts which, in accordance with this invention, are flexible during the shaping or molding steps, cannot be too much emphasized. This is particularly noticeable in conforming the upper to the shoulder of the insole. The flexible upper parts are readily conformable to this contour whereas if the upper contains a premolded counter stiffener, it will bridge and tend to bulge away from the shoulder.

Another advantage of the present invention is that it completely obviates the necessity of any preparatory treatment of the catalyst-impregnated blank at the time the parts of the upper are being assembled, such for example as activating with solvent solution or mulling. The blank may be handled and inserted in the counter pocket like a piece of dry flexible cloth, whereas a counter stiffener of leather or fibreboard must be properly mulled or tempered in order that the conventional counter molding operation may be carried out.

Still another important advantage of our novel process is that the operator is not required at any time to touch the urea resin in liquid or semi-liquid form. The process is therefore carried out in a cleanly manner with no danger from the toxicity of the resin since the latter is preferably applied with a brush to the inner surface of the upper as shown in FIG. 3 in areas out of reach of the operator's hands. This is greatly to be preferred to prior processes of using urea resins when the operator is obliged to pick up in his fingers a blank wet with the liquid urea.

Having thus disclosed our invention and described in detail a preferred manner of carrying it out, we claim and desire to secure by Letters Patent:

1. The process of forming the counter portion of a shoe comprising the steps of coating the inner surface of the rear end of the upper with a partially polymerized urea resin, contacting a limited area of the coated surface with a catalyst and placing the upper on a last while the catalyst acts to polymerize the resin and convert the contacted area of the upper into stiff resilient character, meanwhile leaving the other coated areas of the upper free of catalyst and pliable, then softening and molding the unstiffened area of the resin-coated upper by heat and pressure as thermoplastic material, and causing it to stiffen in cooling.

2. A shoemaking process comprising the steps of impregnating an area of a closed upper with resin which is both polymerizable and thermoplastic, converting a limited portion of the impregnated area of the upper into a stiff resilient condition by contacting it with a catalyst while leaving other resin-impregnated portions free of catalyst and in pliable condition, softening and molding the uncontacted portions of the resin-impregnated upper by the application of heat and pressure, and causing said portions to stiffen in cooling as thermoplastic material.

3. A shoemaking process comprising the steps of impregnating an area in a flexible shoe upper with a polymerizable and thermoplastic resin selected from the group thiourea-aldehyde, melamine-aldehyde and phenol-aldehyde, molding a portion of the impregnated area while flexible and stiffening it by contacting it with a catalyst causing polymerization to an insoluble infusible stage while leaving other portions of the impregnated areas free of the catalyst and pliable, then softening the said uncontacted areas and molding under heat and pressure as thermoplastic material, and causing said areas to stiffen on cooling.

4. A shoemaking process comprising the steps of superposing within and upon the outer integument of an upper a quarter lining of fabric impregnated with a catalyst and covered upon its exposed surface with flocking which masks the catalyst in the lining, applying a polymerizable and thermoplastic resin in liquid form to the interface of the said integument over an area larger than said quarter lining, molding the contacting areas under polymerizing conditions, softening and molding under conditions of heat and pressure the outer integument of the upper in areas which lie outside the quarter lining, and causing said areas to stiffen on cooling.

5. The shoemaking process comprising the steps of stitching into the quarter portion of an upper a quarter lining and an attached textile blank impregnated with a catalyst thus forming a counter pocket enclosing the impregnated blank, coating a selected area of the inner surface of the upper which is larger than said textile blank with a polymerizable and thermoplastic urea resin in liquid form, molding and stiffening the contacting coated area of the upper under polymerizing conditions, and molding the uncontacted and coated margin of the upper under conditions of heat and pressure, and causing said margin to stiffen on cooling.

6. The shoemaking process comprising the steps of fastening into the quarter portion of an upper a quarter lining and an attached blank of less area than the lining and impregnated with a catalyst thus forming a counter pocket enclosing the smaller impregnated blank, coating the inner surface of the outer integument of the upper with a polymerizable and thermoplastic urea resin in areas including the lasting margin of said integument which lie outside the contour of said blank and also that contacting the enclosed catalyst-impregnated blank, stiffening the latter area by catalytic polymerization of the urea resin thereon, soften the uncontacted lasting margin of the integument and molding under heat and pressure, and finally causing the said margin to stiffen on cooling.

References Cited in the file of this patent

UNITED STATES PATENTS

| | | |
|---|---|---|
| 978,324 | Micheel | Dec. 13, 1910 |
| 1,982,725 | Clarke et al. | Dec. 4, 1934 |
| 2,277,941 | Almy | Mar. 31, 1942 |
| 2,344,458 | Colella | Mar. 14, 1944 |
| 2,424,284 | Olpin et al. | July 22, 1947 |
| 2,424,869 | Wedger | July 29, 1947 |
| 2,919,453 | Shuttleworth | Jan. 5, 1960 |

FOREIGN PATENTS

| | | |
|---|---|---|
| 793,846 | Great Britain | Apr. 23, 1958 |